(12) United States Patent
Toyooka et al.

(10) Patent No.: US 12,202,418 B2
(45) Date of Patent: Jan. 21, 2025

(54) VEHICLE POWER SUPPLY SYSTEM

(71) Applicant: HONDA MOTOR CO., LTD., Tokyo (JP)

(72) Inventors: Kazuki Toyooka, Tokyo (JP); Yuhei Matsuo, Tokyo (JP); Hayahito Ukai, Tokyo (JP); Yasuhiro Ikeda, Tokyo (JP); Hironori Deno, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 93 days.

(21) Appl. No.: 17/853,115

(22) Filed: Jun. 29, 2022

(65) Prior Publication Data
US 2023/0001868 A1 Jan. 5, 2023

(30) Foreign Application Priority Data
Jul. 2, 2021 (JP) .................................. 2021-110975

(51) Int. Cl.
*B60R 16/023* (2006.01)
*B60R 16/03* (2006.01)
(Continued)

(52) U.S. Cl.
CPC .......... *B60R 16/0232* (2013.01); *B60R 16/03* (2013.01); *F02N 11/0866* (2013.01); *H02J 9/068* (2020.01)

(58) Field of Classification Search
CPC . B60R 16/0232; B60R 16/03; F02N 11/0866; F02N 2011/0874; F02N 11/087;
(Continued)

(56) References Cited

U.S. PATENT DOCUMENTS

2004/0066200 A1* 4/2004 Fujioka ................ G01R 31/343
324/522
2013/0317729 A1* 11/2013 Mitsuyama ............. F02D 35/00
701/113
(Continued)

FOREIGN PATENT DOCUMENTS

JP 2016-060259 A 4/2016
JP 2016-103935 A 6/2016
(Continued)

OTHER PUBLICATIONS

Dec. 6, 2022, Japanese Office Action issued for related JP Application No. 2021-110975.

*Primary Examiner* — Rexford N Barnie
*Assistant Examiner* — Thai H Tran
(74) *Attorney, Agent, or Firm* — Paratus Law Group, PLLC (57) ABSTRACT

A vehicle power supply system, mounted on a vehicle including an internal combustion engine, includes: a main power supply system including a main low-voltage power supply; and a backup power supply system including a backup low-voltage power supply. A starter motor that starts the internal combustion engine is connected to the main power supply system. At least one of a vehicle control device, configured to control the main power supply system, the backup power supply system, the internal combustion engine and the starter motor, and a backup power supply control device of the backup power supply system is configured to execute an abnormality determination processing of determining whether an abnormality occurs in the main power supply system, and does not execute the abnormality determination processing when the starter motor is in operation, or determines that no abnormality occurs in the main (Continued)

power supply system in the abnormality determination processing.

6 Claims, 5 Drawing Sheets

(51) Int. Cl.
*F02N 11/08* (2006.01)
*H02J 9/06* (2006.01)

(58) Field of Classification Search
CPC ............. F02N 11/10; F02N 2011/0888; F02N 2200/063; F02N 2250/02; H02J 9/068; H02J 7/1423
See application file for complete search history.

(56) References Cited

U.S. PATENT DOCUMENTS

| | | | |
|---|---|---|---|
| 2017/0349048 A1* | 12/2017 | Nakayama | ................ B60L 3/04 |
| 2020/0040859 A1* | 2/2020 | Kinoshita | ............... B60L 50/15 |
| 2020/0238832 A1 | 7/2020 | Nakayama et al. | |
| 2022/0041059 A1 | 2/2022 | Nakayama et al. | |

FOREIGN PATENT DOCUMENTS

| | | |
|---|---|---|
| JP | 2017-218013 A | 12/2017 |
| JP | 2018-186675 A | 11/2018 |

* cited by examiner

VEHICLE POWER SUPPLY SYSTEM

CROSS-REFERENCE TO RELATED APPLICATIONS

The present application claims the benefit of priority of Japanese Patent Application No. 2021-110975, filed on Jul. 2, 2021, the content of which is incorporated herein by reference.

TECHNICAL FIELD

The present invention relates to a vehicle power supply system to be mounted on a vehicle. In particular, the present invention relates to a vehicle power supply system to be mounted on a vehicle including an internal combustion engine.

BACKGROUND ART

In recent years, there has been a need to improve traffic safety in order to make cities and human settlements inclusive, safe, resilient and sustainable. From the viewpoint of improving the traffic safety, in vehicles, for example, it is required to ensure the traffic safety even w % ben an abnormality occurs in the vehicle, for example.

Therefore, a vehicle power supply system is known in which, when an abnormality occurs in a main power supply, by supplying electric power from a backup power supply to a specific important load, it is possible to continue supply of electric power to the specific important load, and it is possible to ensure traffic safety even when an abnormality occurs in the main power supply (for example, see JP-A-2017-218013).

The vehicle power supply system of JP-A-2017-218013 includes an engine that is an internal combustion engine. In general, a vehicle including an engine that is an internal combustion engine is provided with a starter motor for cranking the internal combustion engine to generate power for starting the internal combustion engine. Since the starter motor requires a large amount of electric power to operate, in a vehicle including the internal combustion engine and the starter motor, an output voltage of a battery that supplies electric power for driving the starter motor is likely to decrease when the starter motor is in operation, for example, when the vehicle returns from an idling stop.

In the vehicle power supply system of JP-A-2017-218013, when a voltage of the main power supply detected by a battery sensor is equal to or less than a predetermined voltage, it is detected that the main power supply is abnormal. Therefore, in the vehicle power supply system of JP-A-2017-218013, when an output voltage of the main power supply decreases to equal to or less than a predetermined voltage due to an operation of the starter motor, for example, when the vehicle returns from an idling stop, it may be erroneously determined that an abnormality occurs in a main power supply system even though no abnormality occurs in the main power supply system including the main power supply.

SUMMARY

The present invention provides a vehicle power supply system capable of preventing an erroneous determination that an abnormality occurs in a main power supply system due to the fact that a starter motor is in operation.

According to an aspect of the present invention, there is provided a vehicle power supply system being mounted on a vehicle including an internal combustion engine, the vehicle power supply system including: a main power supply system including a main low-voltage power supply and a normal load; and a backup power supply system including a backup low-voltage power supply and an emergency important load and connected to the main power supply system, where: a starter motor that starts the internal combustion engine is connected to the main power supply system; the backup power supply system is configured to supply electric power of the backup low-voltage power supply to the main power supply system; the backup power supply system includes a switching device configured to switch connection and cut-off with the main power supply system, and a backup power supply control device configured to control the switching device; at least one of the normal load and the emergency important load includes a vehicle control device configured to control the main power supply system, the backup power supply system, the internal combustion engine, and the starter motor; and at least one of the vehicle control device and the backup power supply control device is configured to execute an abnormality determination processing of determining whether an abnormality occurs in the main power supply system, and does not execute the abnormality determination processing when the starter motor is in operation, or determines that no abnormality occurs in the main power supply system in the abnormality determination processing.

According to the present invention, when the starter motor is in operation, the abnormality determination processing is not executed, or it is determined that no abnormality occurs in the main power supply system in the abnormality determination processing, so that it is possible to prevent an erroneous determination that an abnormality occurs in the main power supply system due to the operation of the starter motor.

DESCRIPTION OF EMBODIMENTS

Hereinafter, an embodiment of a vehicle power supply system according to the present invention will be described with reference to the accompanying drawings.

[Overall Configuration of Vehicle Power Supply System]

Figure 1:
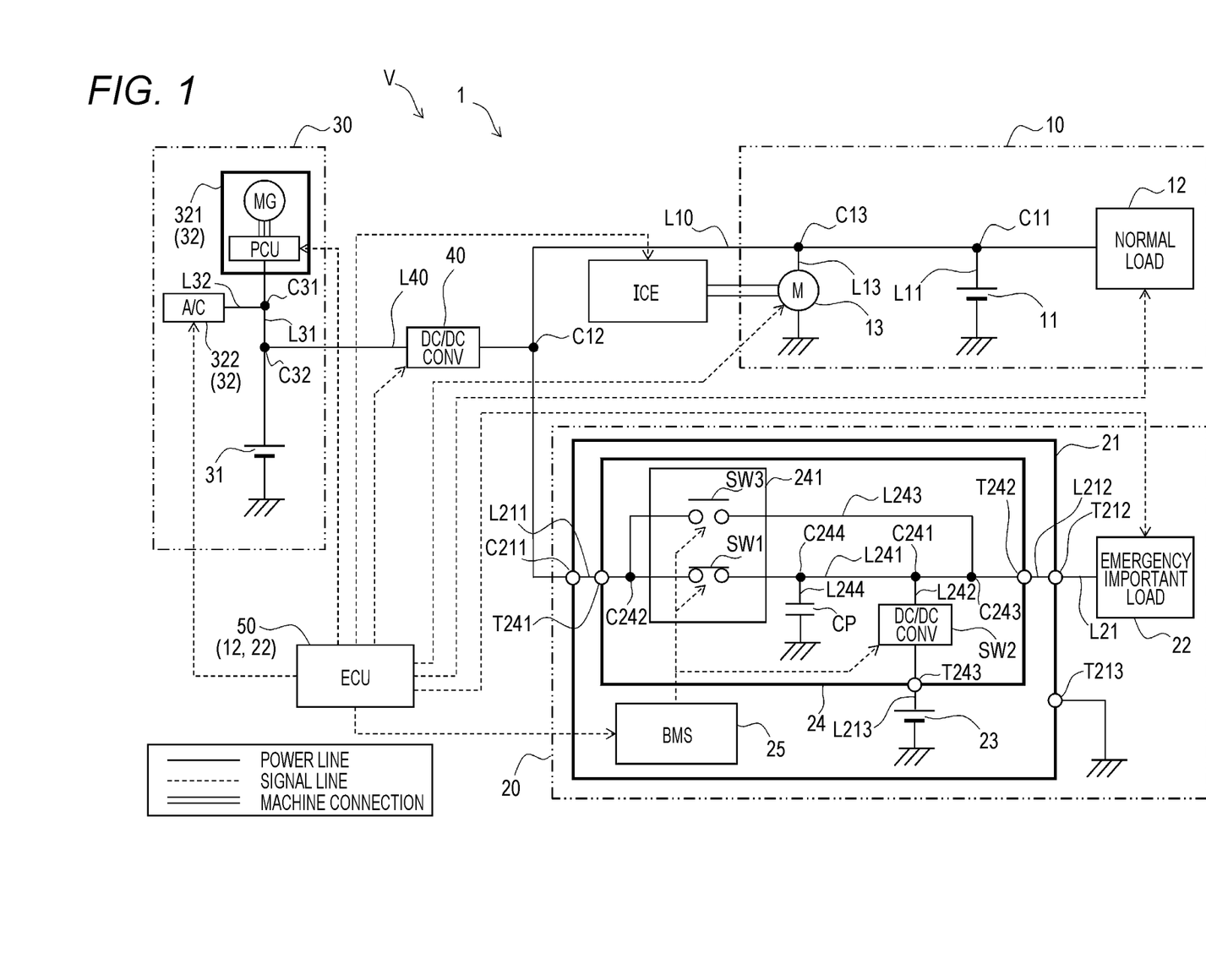
FIG. 1 is a schematic configuration diagram of a vehicle power supply system according to an embodiment of the present invention.

As shown in FIG. 1, a vehicle power supply system 1 of a vehicle V according to the present embodiment includes a main power supply system 10, a backup power supply system 20 connected to the main power supply system 10, a high-voltage power supply system 30, and a step-down device 40. The high-voltage power supply system 30 is connected to the main power supply system 10 and the backup power supply system 20 via the step-down device 40. The step-down device 40 steps down electric power flowing through the high-voltage power supply system 30. The step-down device 40 is, for example, a DC-DC converter.

An internal combustion engine ICE is mounted on the vehicle V on which the vehicle power supply system 1 is mounted. The internal combustion engine ICE is, for example, a reciprocating engine. The internal combustion engine ICE may function as a power source that drives the vehicle V, or may function as a power source that drives a generator (not shown). That is, the vehicle V on which the vehicle power supply system 1 is mounted may be a parallel hybrid vehicle or a series parallel hybrid vehicle, or may be a series hybrid vehicle.

<Main Power Supply System>

The main power supply system 10 includes a main low-voltage power supply 11, a normal load 12, and a starter motor 13.

The main low-voltage power supply 11 is, for example, a secondary battery such as a lead battery. The main low-voltage power supply 11 outputs electric power having a voltage of, for example, 12 V.

The main low-voltage power supply 11 is provided on a connection line L11. One end portion of the connection line L11 is connected to a contact C11 formed on a connection line L10, and the other end portion of the connection line L11 is connected to a ground line having a reference potential of the vehicle power supply system 1. A positive electrode side of the main low-voltage power supply 11 is connected to a contact C11 side of the connection line L11, and a negative electrode side of the main low-voltage power supply 11 is connected to a ground line side of the connection line L11.

The normal load 12 includes a load having a function related to a traveling operation, a stopping operation, or drive control of the vehicle V. The normal load 12 includes an electronic control unit (ECU) 50 used for the drive control of the vehicle V. Further, the normal load 12 may include at least one of an auxiliary load used for braking the vehicle V, such as an automatic brake device, an auxiliary load used for steering the vehicle V, such as an automatic steering device, an auxiliary load used for acquiring external information of the vehicle V, such as light detection and ranging (LiDAR), a wiper device, a power window device, and instruments.

The normal load 12 is connected to one end portion of the connection line L10.

The starter motor 13 is an electric motor that generates power for cranking the internal combustion engine ICE. The starter motor 13 cranks the internal combustion engine ICE to start the internal combustion engine ICE. The starter motor 13 is provided on a connection line L13. One end portion of the connection line L13 is connected to a contact C13 formed on the connection line L10, and the other end portion of the connection line L13 is connected to a ground line having a reference potential of the vehicle power supply system 1. The contact C13 is formed on the other end side of the connection line L10 with respect to the contact C11.

<Backup Power Supply System>

The backup power supply system 20 includes a backup power supply unit 21 and an emergency important load 22.

The backup power supply unit 21 includes a backup low-voltage power supply 23, a switching device 24, and a backup power supply control device 25 that controls the switching device 24.

The backup power supply unit 21 includes a first external connection terminal T211, a second external connection terminal T212, and a ground terminal T213. The other end portion of the connection line L10 is connected to the first external connection terminal T211. The ground terminal T213 is connected to a ground line.

The emergency important load 22 includes a load having a function related to a traveling operation, a stopping operation, or drive control of the vehicle V. The emergency important load 22 is a load having a function related to a minimum necessary traveling operation, stopping operation, or drive control for safely moving to a road shoulder of a road and stopping even when a drive force of a drive source is lost. The emergency important load 22 includes the above-described ECU 50 used for the drive control of the vehicle V. The emergency important load 22 may further include at least one of an auxiliary load used for braking the vehicle V, such as an automatic brake device, an auxiliary load used for steering the vehicle V, such as an automatic steering device, and an auxiliary load used for acquiring the external information of the vehicle V, such as light detection and ranging (LiDAR).

The emergency important load 22 may overlap with the normal load 12 of the main power supply system 10. That is, a part of the normal load 12 of the main power supply system 10 may also serve as the emergency important load 22. Thus, the emergency important load 22 can be made redundant. In other words, the emergency important load 22 overlapping with the normal load 12 of the main power supply system 10 can also be operated by the main power supply system 10 and can also be operated by the backup power supply system 20. Accordingly, the emergency important load 22 overlapping with the normal load 12 of the main power supply system 10 can be operated even when an abnormality occurs in the main power supply system 10 and can be operated even when an abnormality occurs in the backup power supply system 20.

The emergency important load 22 is connected to the second external connection terminal T212 of the backup power supply unit 21 by a connection line L21.

The switching device 24 includes a first terminal T241, a second terminal T242, and a third terminal T243. The first terminal T241 is connected to the first external connection terminal T211 of the backup power supply unit 21 by a connection line L211. The second terminal T242 is connected to the second external connection terminal T212 of the backup power supply unit 21 by a connection line L212.

The switching device 24 includes a connection line L241 that connects the first terminal T241 and the second terminal T242. The connection line L241 is provided with a first switch SW1. In the present embodiment, the first switch SW1 is a switch having a normally open (NO) contact. The normally open contact is a contact that maintains the first switch SW1 in an OFF state and maintains the connection line L241 in a cut-off state when an operation signal is not applied to the first switch SW1. Specifically, in the case of an electromagnetic switch (for example, an electromagnetic contactor or an electromagnetic switch) in which an operation force is an electromagnetic force, when the electromagnetic force due to an operation current is not generated, the first switch SW1 is maintained in the OFF state and the connection line L241 is maintained in the cut-off state. The first switch SW1 is, for example, a semiconductor switch.

The switching device 24 includes a connection line L242 that connects the connection line L241 and the third terminal T243. One end portion of the connection line L242 is connected to the connection line L241 at a contact C241 formed between the first switch SW1 and the second terminal T242 on the connection line L241, and the other end portion of the connection line L242 is connected to the third terminal T243. The connection line L242 is provided with a second switch SW2. In the present embodiment, the second switch SW2 is a DC-DC converter. The second switch SW2 maintains the connection line L242 in a connected state when the second switch SW2 is in an ON state, and maintains the connection line L242 in a cut-off state when the second switch SW2 is in an OFF state. Further, since the second switch SW2 is a DC-DC converter, a voltage of electric power flowing through the connection line L242 can be stepped up or stepped down when the second switch SW2 is in the ON state. Thus, the second switch SW2 can switch the connection line L242 between the connected state and the cut-off state, and can step up or step down the voltage of the electric power flowing through the connection line L242 when the connection line L242 is in the connected state.

The switching device 24 includes a connection line L243 connected in parallel with the connection line L241. One end portion of the connection line L243 is connected to a contact C242 formed between the first terminal T241 and the first switch SW1 on the connection line L241, and the other end portion of the connection line L243 is connected to a contact C243 formed between the contact C241 and the second terminal T242 on the connection line L241. The connection line L243 is provided with a third switch SW3. In the present embodiment, the third switch SW3 is a switch having a normally closed (NC) contact. The normally closed contact is a contact that maintains the third switch SW3 in an ON state and maintains the connection line L243 in a connected state when an operation signal is not applied to the third switch SW3. Specifically, in the case of an electromagnetic switch (for example, an electromagnetic contactor or an electromagnetic switch) in which an operation force is an electromagnetic force, when the electromagnetic force due to an operation current is not generated, the third switch SW3 is maintained in the ON state and the connection line L243 is maintained in the connected state. The third switch SW3 is, for example, a semiconductor switch.

Thus, in the backup power supply system 20, the first switch SW1 having a normally open contact and the third switch SW3 having a normally closed contact are provided in parallel.

When at least one of the first switch SW1 and the third switch SW3 is in the ON state, the backup power supply system 20 is connected to the main power supply system 10, electric power of the backup low-voltage power supply 23 can be supplied to the main power supply system 10, and electric power can be supplied from the main power supply system 10 to the emergency important load 22. On the other hand, when both the first switch SW1 and the third switch SW3 are in the OFF state, connection between the backup power supply system 20 and the main power supply system 10 is cut off.

Therefore, even when electric power is not supplied to the backup power supply control device 25, the electric power can be supplied from the main power supply system 10 to the emergency important load 22.

In the present embodiment, the first switch SW1 and the third switch SW3 are modularized as a switch module 241.

The switching device 24 includes a connection line L244 that connects the connection line L241 and a ground line. One end portion of the connection line L244 is connected to a contact C244 formed between the first switch SW1 and the contact C241 on the connection line L241, and the other end portion of the connection line L244 is connected to a ground line. The connection line L244 is provided with a capacitor CP.

The backup low-voltage power supply 23 is, for example, a secondary battery such as a lithium ion battery. The backup low-voltage power supply 23 outputs electric power having a voltage of, for example, 12 V.

The backup low-voltage power supply 23 is provided on a connection line L213. One end portion of the connection line L213 is connected to the third terminal T243 of the switching device 24, and the other end portion of the connection line L213 is connected to a ground line. The backup low-voltage power supply 23 is provided on the connection line L213 such that a positive electrode side is a third terminal T243 side of the switching device 24 and a negative electrode side is a ground line side.

Therefore, when the second switch SW2 is in the ON state, the backup low-voltage power supply 23 supplies electric power from the connection line L213 to the backup power supply system 20 through the connection line L242 of the switching device 24. At this time, the electric power output from the backup low-voltage power supply 23 is stepped up or stepped down to a desired voltage by the second switch SW2, and is supplied to the backup power supply system 20. On the other hand, when the second switch SW2 is in the OFF state, the connection line L242 of the switching device 24 is in the cut-off state, and thus electric power is not supplied from the backup low-voltage power supply 23 to the backup power supply system 20.

The backup power supply control device 25 includes a processor such as a central processing unit (CPU). The backup power supply control device 25 further includes a read only memory (ROM), and controls the first switch SW1, the second switch SW2, and the third switch SW3 by software stored in the ROM. Specifically, the backup power supply control device 25 switches the ON state and the OFF state of the first switch SW1, the second switch SW2, and the third switch SW3. The backup power supply control device 25 is connected to the first switch SW1, the second switch SW2, and the third switch SW3 by signal lines. The backup power supply control device 25 transmits operation signals to the first switch SW1, the second switch SW2, and the third switch SW3 via the signal lines. The operation signals include signals for operating the first switch SW1, the second switch SW2, and the third switch SW3 to the ON state and the OFF state.

The backup power supply control device 25 operates by, for example, electric power stored in the backup low-voltage power supply 23.

<High-Voltage Power Supply System>

The high-voltage power supply system 30 includes a high-voltage power supply 31 and a high-voltage load 32.

The high-voltage power supply 31 is, for example, a secondary battery such as a lithium ion battery. The high-voltage power supply 31 outputs electric power having a higher voltage than the main low-voltage power supply 11 and the backup low-voltage power supply 23. The high-voltage power supply 31 outputs the electric power having a voltage of, for example, 200 V.

The high-voltage power supply 31 is connected to a connection line L31. One end portion of the connection line L31 is connected to a ground line, and a negative electrode side of the high-voltage power supply 31 is connected to a ground line side of the connection line L31.

The high-voltage load 32 operates with a higher voltage than the normal load 12 and the emergency important load 22. In the present embodiment, the high-voltage load 32 includes a drive unit 321 that drives the vehicle V and an air conditioner 322 that adjusts a temperature inside a vehicle cabin of the vehicle V.

The drive unit 321 includes a rotary electric machine MG that generates power for driving the vehicle V, and a power control unit PCU that controls the rotary electric machine MG. The power control unit PCU includes a DC-DC converter, an inverter, and the like.

The drive unit 321 is connected to the other end portion of the connection line L31. The high-voltage power supply 31 can supply electric power to the drive unit 321. The drive unit 321 converts DC power supplied from the high-voltage power supply 31 into three-phase AC power by the power control unit PCU, and supplies the three-phase AC power to the rotary electric machine MG. Accordingly, the rotary electric machine MG generates power that drives the vehicle V by electric power of the high-voltage power supply 31. The drive unit 321 may generate three-phase AC power by the rotary electric machine MG during braking of the vehicle V, convert the three-phase AC power into DC power by the power control unit PCU, and charge the high-voltage power supply 31 with the DC power.

The air conditioner 322 is connected to a connection line L32 connected to the connection line L31 at a contact C31 formed between the high-voltage power supply 31 on the connection line L31 and the drive unit 321. The air conditioner 322 is operated by the electric power of the high-voltage power supply 31.

<Step-Down Device>

The step-down device 40 is provided on a connection line L40. One end portion of the connection line L40 is connected to a contact C32 formed between the high-voltage power supply 31 and the contact C31 on the connection line L31, and the other end portion of the connection line L40 is connected to a contact C12 formed between the contact C13 on the connection line L13 and the other end portion of the connection line L10 (that is, the first external connection terminal T211 of the backup power supply unit 21 of the backup power supply system 20).

Thus, the high-voltage power supply system 30 is connected to the main power supply system 10 and the backup power supply system 20 via the step-down device 40.

The step-down device 40 steps down the electric power flowing through the high-voltage power supply system 30. The step-down device 40 is, for example, a DC-DC converter. Therefore, a voltage of the electric power flowing through the high-voltage power supply system 30 is stepped down by the step-down device 40, and can be supplied to the main power supply system 10 and the backup power supply system 20.

Further, the step-down device 40 can be switched between a connected state and a cut-off state. When the step-down device 40 is in the connected state, the high-voltage power supply system 30 is connected to the main power supply system 10 and the backup power supply system 20 via the connection line L40 and the step-down device 40. When the step-down device 40 is in the cut-off state, the high-voltage power supply system 30, and the main power supply system 10 and the backup power supply system 20 are cut off.

Therefore, the vehicle power supply system 1 can supply electric power from the high-voltage power supply system 30 to the normal load 12 of the main power supply system 10 and the emergency important load 22 of the backup power supply system 20 via the step-down device 40 even when storage power remaining amounts of the main low-voltage power supply 11 of the main power supply system 10 and the backup low-voltage power supply 23 of the backup power supply system 20 are depleted. Accordingly, the vehicle power supply system 1 can operate the normal load 12 of the main power supply system 10 and the emergency important load 22 of the backup power supply system 20 even when the storage power remaining amounts of the main low-voltage power supply 11 of the main power supply system 10 and the backup low-voltage power supply 23 of the backup power supply system 20 are depleted.

In addition, the vehicle power supply system 1 can charge the main low-voltage power supply 11 of the main power supply system 10 with the electric power of the high-voltage power supply 31 of the high-voltage power supply system 30 via the step-down device 40. Accordingly, it is possible to prevent the storage power remaining amount of the main low-voltage power supply 11 of the main power supply system 10 from being depleted.

In addition, the vehicle power supply system 1 can charge the backup low-voltage power supply 23 of the backup power supply system 20 with the electric power of the high-voltage power supply 31 of the high-voltage power supply system 30 via the step-down device 40. Specifically, by controlling at least one of the first switch SW1 and the third switch SW3 and the second switch SW2 to be in the ON state by the backup power supply control device 25, the electric power of the high-voltage power supply 31 of the high-voltage power supply system 30 can be charged to the backup low-voltage power supply 23 of the backup power supply system 20 via the step-down device 40. Accordingly, it is possible to prevent the storage power remaining amount of the backup low-voltage power supply 23 of the backup power supply system 20 from being depleted.

[Operation of Vehicle Power Supply System]

Next, an operation of the vehicle power supply system 1 will be described.

<Operation of Vehicle Power Supply System in Normal State when Vehicle Power Supply System is in ON State>

First, the operation of the vehicle power supply system 1 in the normal state when the vehicle power supply system 1 is in the ON state will be described.

When the vehicle power supply system 1 is in an ON state, the backup power supply control device 25 of the backup power supply system 20 controls the first switch SW1 to be in the ON state, the second switch SW2 to be in the OFF state, and the third switch SW3 to be in the OFF state in the normal state.

The ON state of the vehicle power supply system 1 refers to a state in which a drive source of the vehicle V is activated and electric power necessary for driving the vehicle V is supplied to auxiliary machines necessary for traveling, and refers to a state in which the vehicle V is traveling or a state in which the vehicle V can immediately travel. In the present embodiment, the ON state of the vehicle power supply system 1 refers to a state in which an ignition switch (not shown) of the vehicle V is ON, the drive unit 321 is activated, and the normal load 12 and the emergency important load 22 are activated.

Therefore, when the vehicle power supply system 1 is in the ON state, since the first switch SW1 is in the ON state, the second switch SW2 is in the OFF state, and the third switch SW3 is in the OFF state in the normal state, the backup low-voltage power supply 23 is cut off by the second switch SW2, and the electric power is not supplied from the backup low-voltage power supply 23. On the other hand, since the first switch SW1 is in the ON state, the main power supply system 10 and the backup power supply system 20 are connected, and the electric power of the main low-voltage power supply 11 is supplied to the emergency important load 22 through the connection line L10 and the connection line L241.

<Operation of Vehicle Power Supply System when Abnormality Occurs in Main Power Supply System when Vehicle Power Supply System is in ON State>

Figure 2:
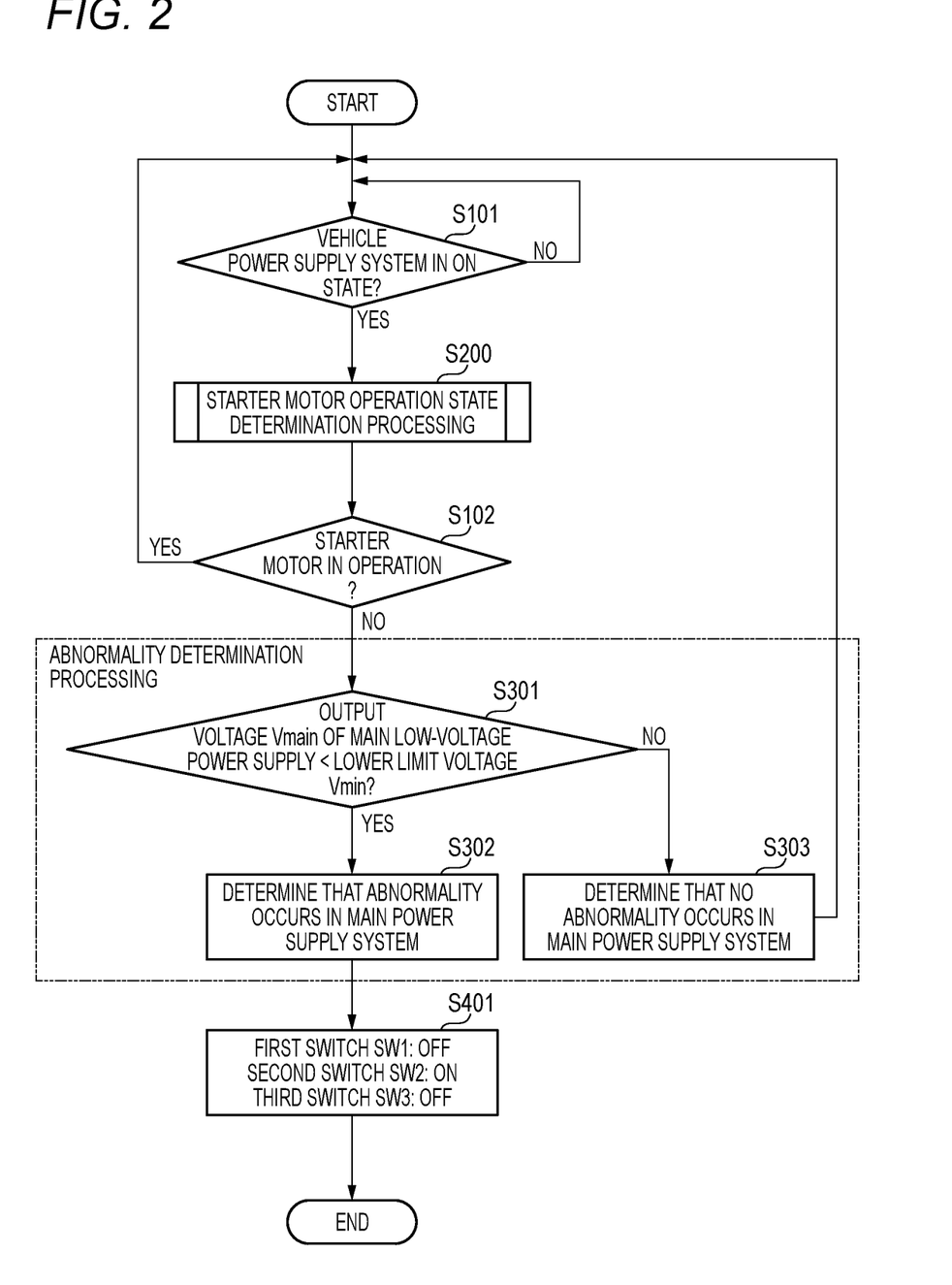
FIG. 2 is a flowchart showing a first example of an operation of the vehicle power supply system when an abnormality occurs in a main power supply system when the vehicle power supply system is in an ON state.
Figure 3:
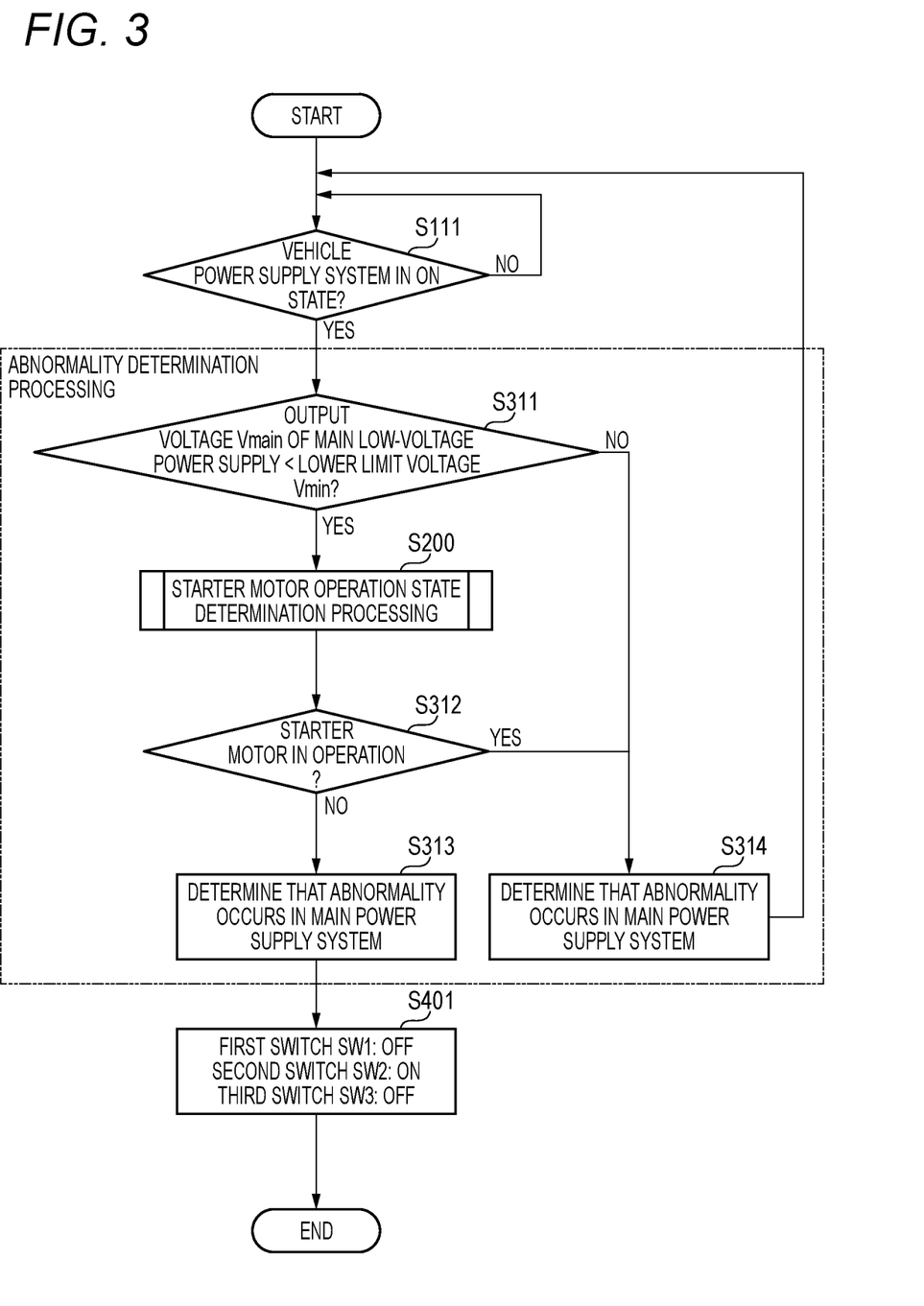
FIG. 3 is a flowchart showing a second example of the operation of the vehicle power supply system when an abnormality occurs in the main power supply system when the vehicle power supply system is in the ON state.

Next, the operation of the vehicle power supply system when an abnormality occurs in the main power supply system when the vehicle power supply system 1 is in the ON state will be described with reference to FIGS. 2 and 3.

The vehicle power supply system 1 can execute an abnormality determination processing of determining whether an abnormality occurs in the main power supply system 10. Further, the vehicle power supply system 1 can execute a starter motor operation state determination processing of determining whether the starter motor 13 is in operation. The abnormality determination processing and the starter motor operation state determination processing may be executed by the ECU 50 mounted on the vehicle V or may be executed by the backup power supply control device 25. Here, a control flow in a case where the abnormality determination processing and the starter motor operation state determination processing are executed by the backup power supply control device 25 will be described as an example.

A voltage sensor (not shown) that detects an output voltage of the main low-voltage power supply 11 is connected to the main low-voltage power supply 11. The voltage sensor outputs a signal indicating the output voltage of the main low-voltage power supply 11. The signal indicating the output voltage of the main low-voltage power supply 11, which is output from the voltage sensor, is input to the backup power supply control device 25. The signal indicating the output voltage of the main low-voltage power supply 11, which is output from the voltage sensor, may be input to the backup power supply control device 25 via the ECU 50, or may be directly input to the backup power supply control device 25 from the voltage sensor.

A detection device (not shown) that detects an operation state of the starter motor 13 is connected to the starter motor 13. The detection device outputs a starter motor operation state signal indicating the operation state of the starter motor 13. The starter motor operation state signal is input to the backup power supply control device 25. The starter motor operation state signal may be input to the backup power supply control device 25 via the ECU 50, or may be directly input to the backup power supply control device 25 from the detection device that detects the operation state of the starter motor 13.

(First Example of Operation of Vehicle Power Supply System when Abnormality Occurs in Main Power Supply System when Vehicle Power Supply System is in ON State)

First, the first example of the operation of the vehicle power supply system when an abnormality occurs in the main power supply system 10 when the vehicle power supply system 1 is in the ON state will be described with reference to FIG. 2.

First, in step S101, it is determined whether the vehicle power supply system 1 is in the ON state. Then, when the vehicle power supply system 1 is in the ON state (step S101: YES), the processing proceeds to step S200, and the starter motor operation state determination processing is executed. When the vehicle power supply system 1 is not in the ON state, that is, when the vehicle power supply system 1 is in an OFF state, the vehicle power supply system 1 is in a standby state until the vehicle power supply system 1 is in the ON state (step S101: a loop of NO).

In step S200, the starter motor operation state determination processing is executed to acquire a determination result as to whether the starter motor 13 is in operation. The starter motor operation state determination processing determines whether the starter motor 13 is in operation based on the starter motor operation state signal input to the backup power supply control device 25. Details of the starter motor operation state determination processing will be described later.

When the starter motor operation state determination processing in step S200 is completed, the processing proceeds to step S102. In step S102, based on a determination result of the starter motor operation state determination processing in step S200, when the starter motor 13 is not in operation (step S102: NO), the processing proceeds to step S301, and the abnormality determination processing is executed. On the other hand, when the starter motor 13 is in operation (step S102: YES), the processing returns to step S101 without executing the abnormality determination processing.

In step S301, it is determined whether an output voltage Vmain of the main low-voltage power supply 11 is less than a preset lower limit voltage Vmin based on the signal indicating the output voltage of the main low-voltage power supply 11, which is input to the backup power supply control device 25. When the output voltage Vmain of the main low-voltage power supply 11 is not less than the preset lower limit voltage Vmin (step S301: NO), the processing proceeds to step S303, where it is determined that no abnormality occurs in the main power supply system 10, and the processing returns to step S101.

When the output voltage Vmain of the main low-voltage power supply 11 is less than the preset lower limit voltage Vmin (step S301: YES), the processing proceeds to step S302, where it is determined that an abnormality occurs in the main power supply system 10, and the processing proceeds to step S401.

In step S401, the backup power supply control device 25 performs control such that the first switch SW1 is switched to the OFF state, the second switch SW2 is switched to the ON state, and the third switch SW3 is maintained in the OFF state. Then, when step S401 is completed, a series of control when an abnormality occurs in the main power supply system when the vehicle power supply system 1 is in the ON state is ended.

Therefore, when the vehicle power supply system 1 is in the ON state, if the abnormality determination processing is executed and it is determined that an abnormality occurs in the main power supply system 10, both the first switch SW1 and the third switch are in the OFF state, and thus the main power supply system 10 and the backup power supply system 20 are cut off. Then, since the second switch SW2 is in the ON state, the electric power of the backup low-voltage power supply 23 is supplied from the connection line L213 to the backup power supply system 20 through the connection line L242 of the switching device 24. At this time, the electric power output from the backup low-voltage power supply 23 is stepped up or stepped down to a desired voltage by the second switch SW2, and is supplied to the backup power supply system 20. Then, the electric power of the backup low-voltage power supply 23 is supplied to the emergency important load 22 from the connection line L21 through the connection line L241 and the connection line L212.

Accordingly, even if an abnormality occurs in the main power supply system 10 when the vehicle power supply system 1 is in the ON state, the emergency important load 22 can be operated using the electric power of the backup low-voltage power supply 23, so that it is possible to perform a minimum necessary traveling operation, stopping operation, or drive control for safely moving the vehicle V to a road shoulder of a road and stopping the vehicle V.

In addition, when an abnormality occurs in the main power supply system 10 when the vehicle power supply system 1 is in the ON state, the backup power supply system 20 is cut off from the main power supply system 10, and thus the electric power of the backup low-voltage power supply 23 is not supplied to the normal load 12. Accordingly, it is possible to operate the emergency important load 22 while reducing power consumption of the backup low-voltage power supply 23.

In addition, while the first switch SW1 and the third switch SW3 are semiconductor switches, the second switch SW2 is a DC-DC converter, so that a time required for the second switch SW2 to switch between the ON state and the OFF state may be longer than the first switch SW1 and the third switch SW3. However, since the switching device 24 includes the capacitor CP as described above, electric power stored in the capacitor CP is discharged for a time from completion of switching of the first switch SW1 to the OFF state to completion of switching of the second switch SW2 to the ON state. Therefore, it is possible to supply electric power to the emergency important load 22 also for the time from the completion of the switching of the first switch SW1 to the OFF state to the completion of the switching of the second switch SW2 to the ON state.

In the present example, it is determined whether an abnormality occurs in the main power supply system 10 based on whether the output voltage Vmain of the main low-voltage power supply 11 is less than the preset lower limit voltage Vmin. On the other hand, since the starter motor 13 requires a large amount of electric power to operate, the output voltage Vmain of the main low-voltage power supply 11 is likely to decrease when the starter motor 13 is in operation, for example, when the vehicle V returns from an idling stop. Therefore, even though no abnormality occurs in the main power supply system 10, the output voltage Vmain of the main low-voltage power supply 11 may decrease due to the fact that the starter motor 13 is in operation, and the output voltage Vmain of the main low-voltage power supply 11 may become less than the preset lower limit voltage Vmin. Therefore, if the abnormality determination processing is executed when the starter motor 13 is in operation to determine whether the output voltage Vmain of the main low-voltage power supply 11 is less than the preset lower limit voltage Vmin (step S301), the output voltage Vmain may decrease due to the fact that the starter motor 13 is in operation even though no abnormality occurs in the main power supply system 10, and it may be erroneously determined that an abnormality occurs in the main power supply system 10.

In the present example, in step S102, when the starter motor 13 is in operation (step S102: YES), the abnormality determination processing is not executed, and thus the processing does not proceed to step S302, and it is not determined that an abnormality occurs in the main power supply system 10. Accordingly, when the output voltage Vmain of the main low-voltage power supply 11 decreases due to the fact that the starter motor 13 is in operation, for example, when the vehicle V returns from an idling stop even though no abnormality occurs in the main power supply system 10, it is possible to prevent an erroneous determination that an abnormality occurs in the main power supply system 10.

(Second Example of Operation of Vehicle Power Supply System when Abnormality Occurs in Main Power Supply System when Vehicle Power Supply System is in ON State)

Next, the second example of the operation of the vehicle power supply system when an abnormality occurs in the main power supply system when the vehicle power supply system 1 is in the ON state will be described with reference to FIG. 3.

First, in step S111, it is determined whether the vehicle power supply system 1 is in the ON state. Then, when the vehicle power supply system 1 is in the ON state (step S111: YES), the processing proceeds to step S311, and an abnormality determination processing is executed. When the vehicle power supply system 1 is not in the ON state, that is, when the vehicle power supply system 1 is in the OFF state, the vehicle power supply system 1 is in a standby state until the vehicle power supply system 1 is in the ON state (step S111: a loop of NO).

In step S311, it is determined whether an output voltage Vmain of the main low-voltage power supply 11 is less than a preset lower limit voltage Vmin based on the signal indicating the output voltage of the main low-voltage power supply 11, which is input to the backup power supply control device 25. When the output voltage Vmain of the main low-voltage power supply 11 is not less than the preset lower limit voltage Vmin (step S311: NO), the processing proceeds to step S314, where it is determined that no abnormality occurs in the main power supply system 10, and the processing returns to step S111.

When the output voltage Vmain of the main low-voltage power supply 11 is less than the preset lower limit voltage Vmin (step S311: YES), the processing proceeds to step S200, where the starter motor operation state determination processing is executed. Thus, in the present example, the starter motor operation state determination processing is executed as one step of the abnormality determination processing.

In step S200, the starter motor operation state determination processing is executed to acquire a determination result as to whether the starter motor 13 is in operation. The starter motor operation state determination processing determines whether the starter motor 13 is in operation based on the starter motor operation state signal input to the backup power supply control device 25. The starter motor operation state determination processing executed in step S200 of the present example is a similar processing as the starter motor operation state determination processing executed in step S200 of the above first example. Details of the starter motor operation state determination processing will be described later.

When the starter motor operation state determination processing in step S200 is completed, the processing proceeds to step S312. In step S312, based on the determination result of the starter motor operation state determination processing in step S200, when the starter motor 13 is in operation (step S312: YES), the processing proceeds to step S314, where it is determined that no abnormality occurs in the main power supply system 10, and the processing returns to step S111.

On the other hand, when the starter motor 13 is not in operation (step S312: NO), the processing proceeds to step S313, where it is determined that an abnormality occurs in the main power supply system 10, and the processing proceeds to step S401.

In step S401, the backup power supply control device 25 performs control such that the first switch SW1 is switched to the OFF state, the second switch SW2 is switched to the ON state, and the third switch SW3 is maintained in the OFF state. Then, when step S401 is completed, a series of control when an abnormality occurs in the main power supply system when the vehicle power supply system 1 is in the ON state is ended. Step S401 of the present example is a similar processing as step S401 of the above first example.

Therefore, when the vehicle power supply system 1 is in the ON state, if the abnormality determination processing is executed and it is determined that an abnormality occurs in the main power supply system 10, both the first switch SW1 and the third switch are in the OFF state, and thus the main power supply system 10 and the backup power supply system 20 are cut off. Then, since the second switch SW2 is in the ON state, the electric power of the backup low-voltage power supply 23 is supplied from the connection line L213 to the backup power supply system 20 through the connection line L242 of the switching device 24. At this time, the electric power output from the backup low-voltage power supply 23 is stepped up or stepped down to a desired voltage by the second switch SW2, and is supplied to the backup power supply system 20. Then, the electric power of the backup low-voltage power supply 23 is supplied to the emergency important load 22 from the connection line L21 through the connection line L241 and the connection line L212.

Accordingly, even if an abnormality occurs in the main power supply system 10 when the vehicle power supply system 1 is in the ON state, the emergency important load 22 can be operated using the electric power of the backup low-voltage power supply 23, so that it is possible to perform a minimum necessary traveling operation, stopping operation, or drive control for safely moving the vehicle V to a road shoulder of a road and stopping the vehicle V.

In addition, when an abnormality occurs in the main power supply system 10 when the vehicle power supply system 1 is in the ON state, the backup power supply system 20 is cut off from the main power supply system 10, and thus the electric power of the backup low-voltage power supply 23 is not supplied to the normal load 12. Accordingly, it is possible to operate the emergency important load 22 while reducing power consumption of the backup low-voltage power supply 23.

In addition, while the first switch SW1 and the third switch SW3 are semiconductor switches, the second switch SW2 is a DC-DC converter, so that the time required for the second switch SW2 to switch between the ON state and the OFF state may be longer than the first switch SW1 and the third switch SW3. However, since the switching device 24 includes the capacitor CP as described above, the electric power stored in the capacitor CP is discharged for the time from the completion of the switching of the first switch SW1 to the OFF state to the completion of the switching of the second switch SW2 to the ON state. Therefore, it is possible to supply electric power to the emergency important load 22 also for the time from the completion of the switching of the first switch SW1 to the OFF state to the completion of the switching of the second switch SW2 to the ON state.

In the present example, similar as in the above first example, it is determined whether an abnormality occurs in the main power supply system 10 based on whether the output voltage Vmain of the main low-voltage power supply 11 is less than the preset lower limit voltage Vmin. On the other hand, since the starter motor 13 requires a large amount of electric power to operate, the output voltage Vmain of the main low-voltage power supply 11 is likely to decrease when the starter motor 13 is in operation. Therefore, even though no abnormality occurs in the main power supply system 10, the output voltage Vmain of the main low-voltage power supply 11 may decrease due to the fact that the starter motor 13 is in operation, and the output voltage Vmain of the main low-voltage power supply 11 may become less than the preset lower limit voltage Vmin. Therefore, if the abnormality determination processing is executed when the starter motor 13 is in operation to determine whether the output voltage Vmain of the main low-voltage power supply 11 is less than the preset lower limit voltage Vmin (step S301), the output voltage Vmain may decrease due to the fact that the starter motor 13 is in operation even though no abnormality occurs in the main power supply system 10, and it may be erroneously determined that an abnormality occurs in the main power supply system 10.

In the present example, in the abnormality determination processing, when the starter motor 13 is in operation (step S312: YES), it is determined that no abnormality occurs in the main power supply system 10, so that when the output voltage Vmain of the main low-voltage power supply 11 decreases due to the fact that the starter motor 13 is in operation, for example, when the vehicle V returns from an idling stop even though no abnormality occurs in the main power supply system 10, it is possible to prevent an erroneous determination that an abnormality occurs in the main power supply system 10.

<Starter Motor Operation State Determination Processing>

Next, the details of the starter motor operation state determination processing in step S200 described above will be described with reference to FIGS. 4 and 5. As described above, the starter motor operation state signal indicating the operation state of the starter motor 13 is input to the backup power supply control device 25, and the backup power supply control device 25 can execute the starter motor operation state determination processing of determining whether the starter motor 13 is in operation based on the input starter motor operation state signal.

Figure 4:
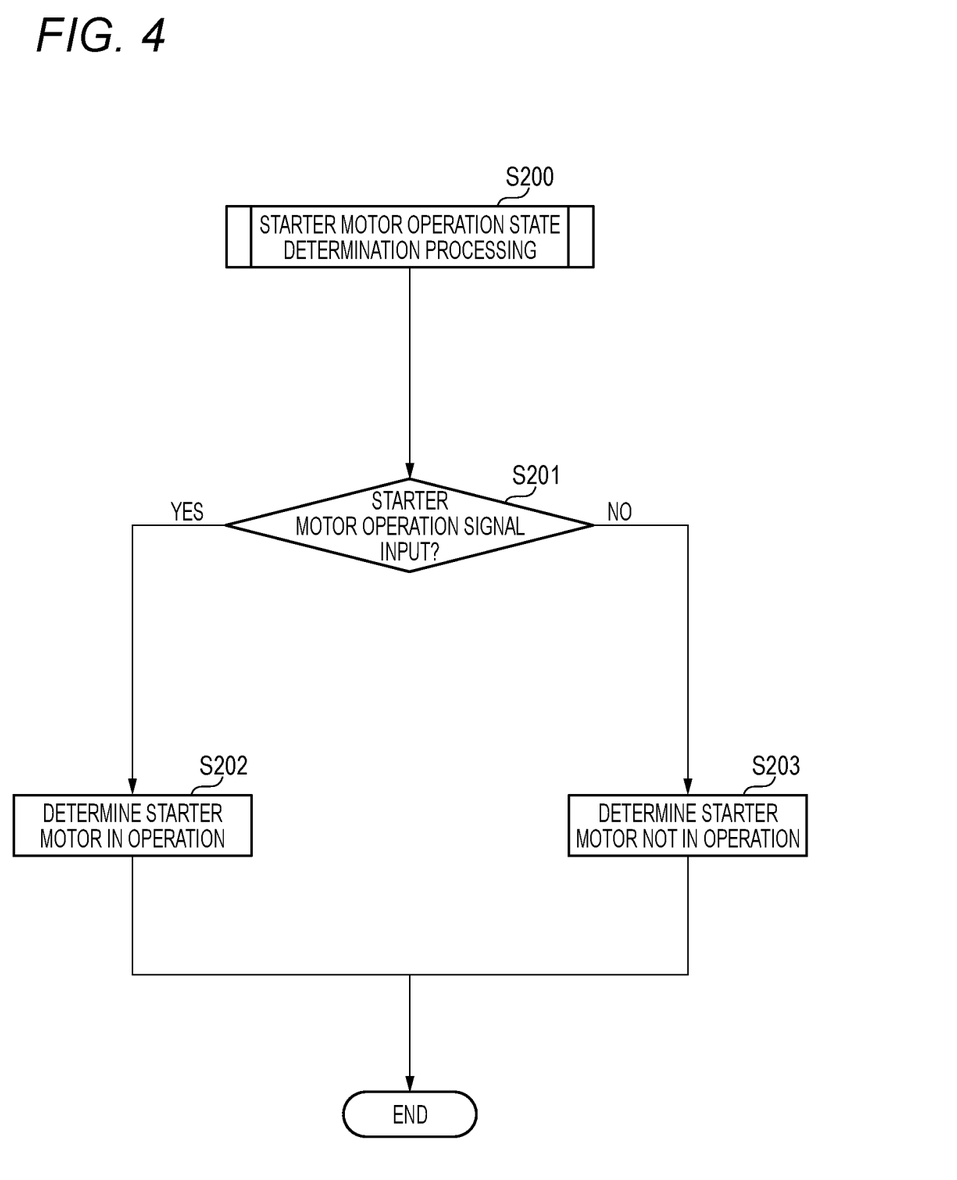
FIG. 4 is a flowchart showing a first example of a starter motor operation state determination processing in the examples of the operations of the vehicle power supply system shown in FIGS. 2 and 3.
Figure 5:
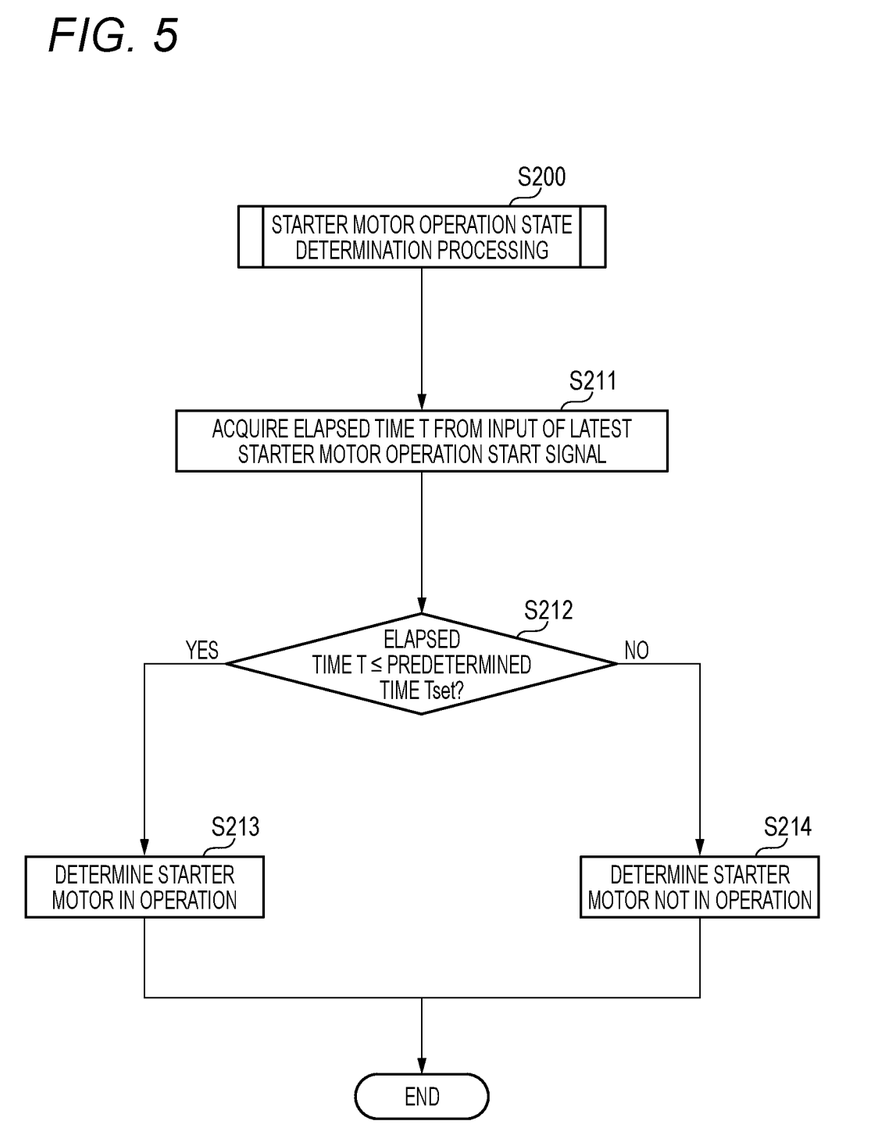
FIG. 5 is a flowchart showing a second example of the starter motor operation state determination processing in the examples of the operations of the vehicle power supply system shown in FIGS. 2 and 3.

Accordingly, the backup power supply control device 25 can execute the starter motor operation state determination processing with a simple configuration, and can accurately determine whether the starter motor 13 is in operation in the starter motor operation state determination processing.

(First Example of Starter Motor Operation State Determination Processing)

First, a first example of the starter motor operation state determination processing will be described with reference to FIG. 4.

In the present example, the above-described detection device that detects the operation state of the starter motor 13 outputs a starter motor operation signal indicating that the starter motor 13 is in operation when the starter motor 13 is in operation. In the present example, the starter motor operation state signal indicating the operation state of the starter motor 13 includes the starter motor operation signal indicating that the starter motor 13 is in operation. When the starter motor 13 is in operation, a starter motor operation signal is input to the backup power supply control device 25. The starter motor operation signal may be input to the backup power supply control device 25 via the ECU 50, or may be directly input to the backup power supply control device 25 from the detection device that detects the operation state of the starter motor 13.

In the present example, in the starter motor operation state determination processing in step S200, first, the processing proceeds to step S201, where it is determined that whether a starter motor operation signal is input to the backup power supply control device 25.

Then, in step S201, when the starter motor operation signal is input to the backup power supply control device 25 (step S201: YES), the processing proceeds to step S202, where it is determined that the starter motor 13 is in operation, and the starter motor operation state determination processing of step S200 ends.

On the other hand, in step S201, when the starter motor operation signal is not input to the backup power supply control device 25 (step S201: NO), the processing proceeds to step S203, where it is determined that the starter motor 13 is not in operation, and the starter motor operation state determination processing of step S200 ends.

Accordingly, in the starter motor operation state determination processing of step S200, it is determined whether the starter motor 13 is in operation based on the starter motor operation signal input to the backup power supply control device 25 when the starter motor 13 is in operation, and thus it is possible to determine whether the starter motor 13 is in operation with high accuracy in the starter motor operation state determination processing.

(Second Example of Starter Motor Operation State Determination Processing)

Next, a second example of the starter motor operation state determination processing will be described with reference to FIG. 5.

In the present example, the above-described detection device that detects the operation state of the starter motor 13 outputs a starter motor operation start signal indicating that the starter motor 13 starts to operate when the starter motor 13 starts to operate. In the present example, the starter motor operation state signal indicating the operation state of the starter motor 13 includes the starter motor operation start signal indicating that the starter motor 13 starts to operate. Then, when the starter motor 13 starts to operate, a starter motor operation start signal is input to the backup power supply control device 25. The starter motor operation start signal may be input to the backup power supply control device 25 via the ECU 50, or may be directly input to the backup power supply control device 25 from the detection device that detects the operation state of the starter motor 13.

In the present example, in the starter motor operation state determination processing in step S200, first, the processing proceeds to step S211 to acquire an elapsed time T since a latest starter motor operation start signal is input to the backup power supply control device 25. Then, the processing proceeds to step S212.

In step S212, it is determined whether the elapsed time T from the input of the latest starter motor operation start signal acquired in step S211 is within a preset predetermined time Tset. The predetermined time Tset is set to be substantially the same as a time during which the starter motor 13 operates when the internal combustion engine ICE is started, based on a general time during which the starter motor 13 operates when the internal combustion engine ICE is started. Therefore, when the elapsed time T from the input of the latest starter motor operation start signal is within the set predetermined time Tset, there is a high probability that the starter motor 13 is in operation. The predetermined time Tset is set to, for example, 3 seconds.

Then, in step S212, when the elapsed time T from the input of the latest starter motor operation start signal acquired in step S211 is within the preset predetermined time Tset (step S212: YES), the processing proceeds to step S213, where it is determined that the starter motor 13 is in operation, and the starter motor operation state determination processing of step S200 ends.

On the other hand, in step S212, when the elapsed time T from the input of the latest starter motor operation start signal acquired in step S211 is not within the preset predetermined time Tset (step S212: NO), the processing proceeds to step S214, where it is determined that the starter motor 13 is not in operation, and the starter motor operation state determination processing of step S200 ends.

Accordingly, if the starter motor operation start signal is input to the backup power supply control device 25, it is possible to determine whether the starter motor 13 is in operation in the starter motor operation state determination processing even if the starter motor operation state signal indicating the operation state of the starter motor 13 is not always input when the starter motor 13 is in operation. Therefore, even when the input of the starter motor operation state signal indicating the operation state of the starter motor 13 is intermittent in the backup power supply control device 25 for some reason, it is possible to determine whether the starter motor 13 is in operation with constant accuracy in the starter motor operation state determination processing.

<Control Over High-Voltage Power Supply System and Step-Down Device During Operation of Starter Motor>

Here, referring back to FIG. 1, control of the high-voltage power supply system 30 and the step-down device 40 during the operation of the starter motor 13 will be described.

When the starter motor 13 is in operation, the ECU 50 controls the high-voltage power supply system 30 and the step-down device 40 such that the electric power of the high-voltage power supply 31 is supplied to the starter motor 13 via the step-down device 40. Therefore, when the starter motor 13 is in operation, the electric power of the high-voltage power supply 31 is stepped down by the step-down device 40 through the connection line L40, and is supplied to the starter motor 13 through the connection line L10 and the connection line L13.

At this time, the ECU 50 controls the high-voltage power supply system 30 and the step-down device 40 so that a voltage of electric power flowing between the step-down device 40 and the starter motor 13 becomes higher than the output voltage Vmain of the main low-voltage power supply 11.

Therefore, since a potential of the contact C13 is higher than a potential of the contact C11, it is possible to prevent a decrease in the output voltage Vmain of the main low-voltage power supply 11 when the starter motor 13 is in operation. Accordingly, even in a case where, for some reason, a problem occurs such as a starter motor operation state signal indicating the operation state of the starter motor 13 not being input to the backup power supply control device 25, the starter motor operation state determination processing in step S200 described above is not normally performed, and it is unknown or erroneously determined whether the starter motor 13 is in operation, when it is determined whether the output voltage Vmain of the main low-voltage power supply 11 is less than the preset lower limit voltage Vmin in step S301 and step S311 described above, it is possible to prevent an erroneous determination that an abnormality occurs in the main power supply system 10 due to the fact that the starter motor 13 is in operation even though no abnormality occurs in the main power supply system 10.

Although one embodiment of the present invention has been described above with reference to the accompanying drawings, it goes without saying that the present invention is not limited to such an embodiment. It will be apparent to those skilled in the art that various changes and modifications may be conceived within the scope of the claims. It is also understood that the various changes and modifications belong to the technical scope of the present invention. In addition, constituent elements in the embodiments described above may be combined freely within a range not departing from the spirit of the present invention.

For example, in the present embodiment, a case in which the abnormality determination processing and the starter motor operation state determination processing are executed by the backup power supply control device 25 is described as an example, but the abnormality determination processing and the starter motor operation state determination processing may be executed by the ECU 50 mounted on the vehicle V.

In addition, for example, in the present embodiment, in the second example of the operation of the vehicle power supply system when an abnormality occurs in the main power supply system when the vehicle power supply system 1 is in the ON state, the starter motor operation state determination processing of step S200 is executed after step S311, but the starter motor operation state determination processing of step S200 may be executed between step S111 and step S311.

In addition, for example, in the present embodiment, the switching device 24 includes the connection line L243 connected in parallel with the connection line L241, the connection line L241 is provided with the first switch SW1, and the connection line L243 is provided with the third switch SW3, but the switching device 24 may not include the connection line L243, and the connection line L241 may be provided with, instead of the first switch SW1 and the third switch SW3, a changeover switch in which functions of the first switch SW1 and the third switch SW3 of the present embodiment are integrated. Specifically, for example, the changeover switch may be a switch having a normally closed (NC) contact, and when an operation signal is not applied to the changeover switch, the changeover switch may be maintained in the ON state and the connection line L241 may be maintained in the connected state. Further, the changeover switch may be an electromagnetic switch (for example, an electromagnetic contactor or an electromagnetic switch) in which an operation force is an electromagnetic force, and when the electromagnetic force due to an operation current is not generated, the changeover switch may be maintained in the ON state and the connection line L241 may be maintained in the connected state. The changeover switch may be, for example, one semiconductor switch. In the abnormality determination processing, when it is determined that an abnormality occurs in the main power supply system 10, the changeover switch is switched to the OFF state by the backup power supply control device 25.

In addition, for example, in the present embodiment, the second switch SW2 is a DC-DC converter, but the second switch SW2 may be capable of switching the connection line L242 between the connected state and the cut-off state. Therefore, the second switch SW2 may be any switch capable of switching the connection line L242 between the connected state and the cut-off state, and may be, for example, a semiconductor switch having a normally open (NO) contact or a normally closed (NC) contact.

For example, although the capacitor CP is provided on the connection line L244 in the switching device 24 in the present embodiment, the capacitor CP may not be provided on the connection line L244 in the switching device 24, for example, in a case in which the second switch SW2 can be switched between the ON state and the OFF state in a short time.

At least the following matters are described in the present description. In the parentheses, the corresponding constituent elements and the like in the above embodiment are shown as an example, and the present invention is not limited thereto.

(1) A vehicle power supply system (vehicle power supply system 1) being mounted on a vehicle (vehicle V) including an internal combustion engine (internal combustion engine ICE), the vehicle power supply system including:

a main power supply system (main power supply system 10) including a main low-voltage power supply (main low-voltage power supply 11) and a normal load (normal load 12); and a backup power supply system (backup power supply system 20) including a backup low-voltage power supply (backup low-voltage power supply 23) and an emergency important load (emergency important load 22) and connected to the main power supply system, in which a starter motor (starter motor 13) that starts the internal combustion engine is connected to the main power supply system, the backup power supply system is configured to supply electric power of the backup low-voltage power supply to the main power supply system, and includes a switching device (switching device 24) configured to switch connection and cut-off with the main power supply system; and a backup power supply control device (backup power supply control device 25) that controls the switching device, at least one of the normal load and the emergency important load includes a vehicle control device (ECU 50) configured to control the main power supply system, the backup power supply system, the internal combustion engine, and the starter motor, and at least one of the vehicle control device and the backup power supply control device is configured to execute an abnormality determination processing of determining whether an abnormality occurs in the main power supply system, and does not execute the abnormality determination processing when the starter motor is in operation, or determines that no abnormality occurs in the main power supply system in the abnormality determination processing.

According to (1), when the starter motor is in operation, the abnormality determination processing is not executed, or it is determined that no abnormality occurs in the main power supply system in the abnormality determination processing, so that it is possible to prevent an erroneous determination that an abnormality occurs in the main power supply system due to the operation of the starter motor, for example, when the vehicle returns from an idling stop even though no abnormality occurs in the main power supply system.

(2) The vehicle power supply system according to (1), in which when occurrence of an abnormality in the main power supply system, in the abnormality determination processing, is detected, the backup power supply control device controls the switching device such that the connection between the backup power supply system and the main power supply system is cut off and the electric power of the backup low-voltage power supply is supplied to the emergency important load.

According to (2), even if an abnormality occurs in the main power supply system, the emergency important load can be operated using the electric power of the backup low-voltage power supply, so that it is possible to perform a minimum necessary traveling operation, stopping operation, or drive control for safely moving the vehicle to a road shoulder of a road and stopping the vehicle.

(3) The vehicle power supply system according to (1) or (2), in which a starter motor operation state signal indicating an operation state of the starter motor is input to at least one of the vehicle control device and the backup power supply control device, and at least one of the vehicle control device and the backup power supply control device is configured to execute a starter motor operation state determination processing of determining whether the starter motor is in operation based on the input starter motor operation state signal.

According to (3), since it is possible to execute starter motor operation state determination processing of determining whether the starter motor is in operation based on the starter motor operation state signal, at least one of the vehicle control device and the backup power supply control device can execute the starter motor operation state determination processing with a simple configuration, and can accurately determine whether the starter motor is in operation in the starter motor operation state determination processing.

(4) The vehicle power supply system according to (3), in which the starter motor operation state signal includes a starter motor operation signal indicating that the starter motor is in operation, which is input to at least one of the vehicle control device and the backup power supply control device when the starter motor is in operation, and in the starter motor operation state determination processing, when the starter motor operation signal is input, a determination is made that the starter motor is in operation.

According to (4), in the starter motor operation state determination processing, it is determined whether the starter motor is in operation based on the starter motor operation signal input when the starter motor is in operation, and thus it is possible to determine whether the starter motor is in operation with high accuracy in the starter motor operation state determination processing.

(5) The vehicle power supply system according to (3), in which the starter motor operation state signal includes a starter motor operation start signal indicating that the starter motor starts to operate, which is input to at least one of the vehicle control device and the backup power supply control device when the starter motor starts to operate, and in the starter motor operation state determination processing, when an elapsed time (elapsed time T) from input of the starter motor operation start signal is within a predetermined time (predetermined time Tset), a determination is made that the starter motor is in operation.

According to (5), if the starter motor operation start signal is input, it is possible to determine whether the starter motor is in operation in the starter motor operation state determination processing even if the starter motor operation state signal indicating the operation state of the starter motor is not always input when the starter motor is in operation. Therefore, even when the input of the starter motor operation state signal indicating the operation state of the starter motor is intermittent for some reason, it is possible to determine whether the starter motor is in operation with constant accuracy in the starter motor operation state determination processing.

(6) The vehicle power supply system according to any one of (1) to (5), further including:

a high-voltage power supply system (high-voltage power supply system 30) including a high-voltage power supply (high-voltage power supply 31) that outputs electric power having a higher voltage than the main low-voltage power supply and the backup low-voltage power supply, and a high-voltage load (high-voltage load 32) that operates with electric power having a higher voltage than the normal load and the emergency important load; and a step-down device (step-down device 40) configured to step down the electric power flowing through the high-voltage power supply system, the vehicle control device is configured to control the high-voltage power supply system, the high-voltage power supply system is connected to the main power supply system and the backup power supply system via the step-down device, the electric power of the high-voltage power supply is suppliable to at least one of the main power supply system and the backup power supply system via the step-down device, and the vehicle control device when the starter motor is in operation, supplies the electric power of the high-voltage power supply to the starter motor via the step-down device, and controls the high-voltage power supply system and the step-down device such that a voltage of the electric power flowing between the step-down device and the starter motor is higher than an output voltage of the main low-voltage power supply.

According to (6), when the starter motor is in operation, the electric power of the high-voltage power supply is supplied to the starter motor via the step-down device, and the voltage of the electric power flowing between the step-down device and the starter motor is higher than the output voltage of the main low-voltage power supply, so that it is possible to prevent a decrease in the output voltage of the main low-voltage power supply when the starter motor is in operation. Accordingly, even when it is unknown or erroneously determined whether the starter motor is in operation for some reason, it is possible to prevent an erroneous determination that an abnormality occurs in the main power supply system due to the operation of the starter motor even though no abnormality occurs in the main power supply system.

The invention claimed is:

1. A vehicle power supply system being mounted on a vehicle including an internal combustion engine, the vehicle power supply system comprising:

a main power supply system including a main low-voltage power supply and a normal load;

a backup power supply system including a backup low-voltage power supply and an emergency important load and connected to the main power supply system, wherein:
a starter motor that starts the internal combustion engine is connected to the main power supply system;
the backup power supply system is configured to supply electric power of the backup low-voltage power supply to the main power supply system;
the backup power supply system includes a switching device configured to switch connection and cut-off with the main power supply system, and a backup power supply control device configured to control the switching device;
at least one of the normal load and the emergency important load includes a vehicle control device configured to control the main power supply system, the backup power supply system, the internal combustion engine, and the starter motor; and
at least one of the vehicle control device and the backup power supply control device is configured to execute an abnormality determination processing of determining whether an abnormality occurs in the main power supply system, and does not execute the abnormality determination processing when the starter motor is in operation, or determines that no abnormality occurs in the main power supply system in the abnormality determination processing;
a high-voltage power supply system including a high-voltage power supply that outputs electric power having a higher voltage than the main low-voltage power supply and the backup low-voltage power supply, and a high-voltage load that operates with electric power having a higher voltage than the normal load and the emergency important load; and
a step-down device configured to step down the electric power flowing through the high-voltage power supply system, wherein:
the vehicle control device is configured to control the high-voltage power supply system;
the high-voltage power supply system is connected to the main power supply system and the backup power supply system via the step-down device;
the electric power of the high-voltage power supply is configured to supply to at least one of the main power supply system and the backup power supply system via the step-down device; and
when the starter motor is in operation, the vehicle control device supplies the electric power of the high-voltage power supply to the starter motor via the step-down device, and controls the high-voltage power supply system and the step-down device such that a voltage of the electric power flowing between the step-down device and the starter motor is higher than an output voltage of the main low-voltage power supply.

2. The vehicle power supply system according to claim 1, wherein:
when occurrence of the abnormality in the main power supply system, in the abnormality determination processing, is detected, the backup power supply control device controls the switching device such that the connection between the backup power supply system and the main power supply system is cut off and the electric power of the backup low-voltage power supply is supplied to the emergency important load.

3. The vehicle power supply system according to claim 1, wherein:

a starter motor operation state signal indicating an operation state of the starter motor is input to the at least one of the vehicle control device and the backup power supply control device; and
the at least one of the vehicle control device and the backup power supply control device is configured to execute a starter motor operation state determination processing of determining whether the starter motor is in operation based on the input starter motor operation state signal.

4. The vehicle power supply system according to claim 3, wherein:
the starter motor operation state signal includes a starter motor operation signal indicating that the starter motor is in operation, the starter motor operation signal being input to the at least one of the vehicle control device and the backup power supply control device when the starter motor is in operation; and
in the starter motor operation state determination processing, when the starter motor operation signal is input, a determination is made that the starter motor is in operation.

5. The vehicle power supply system according to claim 3, wherein:
the starter motor operation state signal includes a starter motor operation start signal indicating that the starter motor starts to operate, which is input to the at least one of the vehicle control device and the backup power supply control device when the starter motor starts to operate; and
in the starter motor operation state determination processing, when an elapsed time from input of the starter motor operation start signal is within a predetermined time, a determination is made that the starter motor is in operation.

6. A power supply method executed by a vehicle power supply system being mounted on a vehicle including an internal combustion engine, the vehicle power supply system comprising: a main power supply system including a main low-voltage power supply and a normal load; and a backup power supply system including a backup low-voltage power supply and an emergency important load and connected to the main power supply system, a starter motor that starts the internal combustion engine is connected to the main power supply system, the method comprising:
supplying, by the backup power supply system, electric power of the backup low-voltage power supply to the main power supply system;
switching, by a switching device included in the backup power supply system, connection and cut-off with the main power supply system;
controlling, by a backup power supply control device included in the switching device, the switching device,
wherein at least one of the normal load and the emergency important load includes a vehicle control device configured to control the main power supply system, the backup power supply system, the internal combustion engine, and the starter motor;
executing, by at least one of the vehicle control device and the backup power supply control device, an abnormality determination processing of determining whether an abnormality occurs in the main power supply system in the abnormality determination processing;
in response to determining that the starter motor is in operation, not executing, by the at least one of the vehicle control device and the backup power supply control device, the abnormality determination processing, or determining that no abnormality occurs in the main power supply system, wherein:

the vehicle power supply system further comprises:
- a high-voltage power supply system including a high-voltage power supply that outputs electric power having a higher voltage than the main low-voltage power supply and the backup low-voltage power supply, and a high-voltage load that operates with electric power having a higher voltage than the normal load and the emergency important load; and
- a step-down device configured to step down the electric power flowing through the high-voltage power supply system;

controlling, by the vehicle control device, the high-voltage power supply system, wherein:

the high-voltage power supply system is connected to the main power supply system and the backup power supply system via the step-down device;

supplying the electric power of the high-voltage power supply to at least one of the main power supply system and the backup power supply system via the step-down device; and when the starter motor is in operation, supplying, by the vehicle control device, the electric power of the high-voltage power supply to the starter motor via the step-down device, and controlling, by the vehicle control device, the high-voltage power supply system and the step-down device such that a voltage of the electric power flowing between the step-down device and the starter motor is higher than an output voltage of the main low-voltage power supply.

* * * * *